Figure 1:
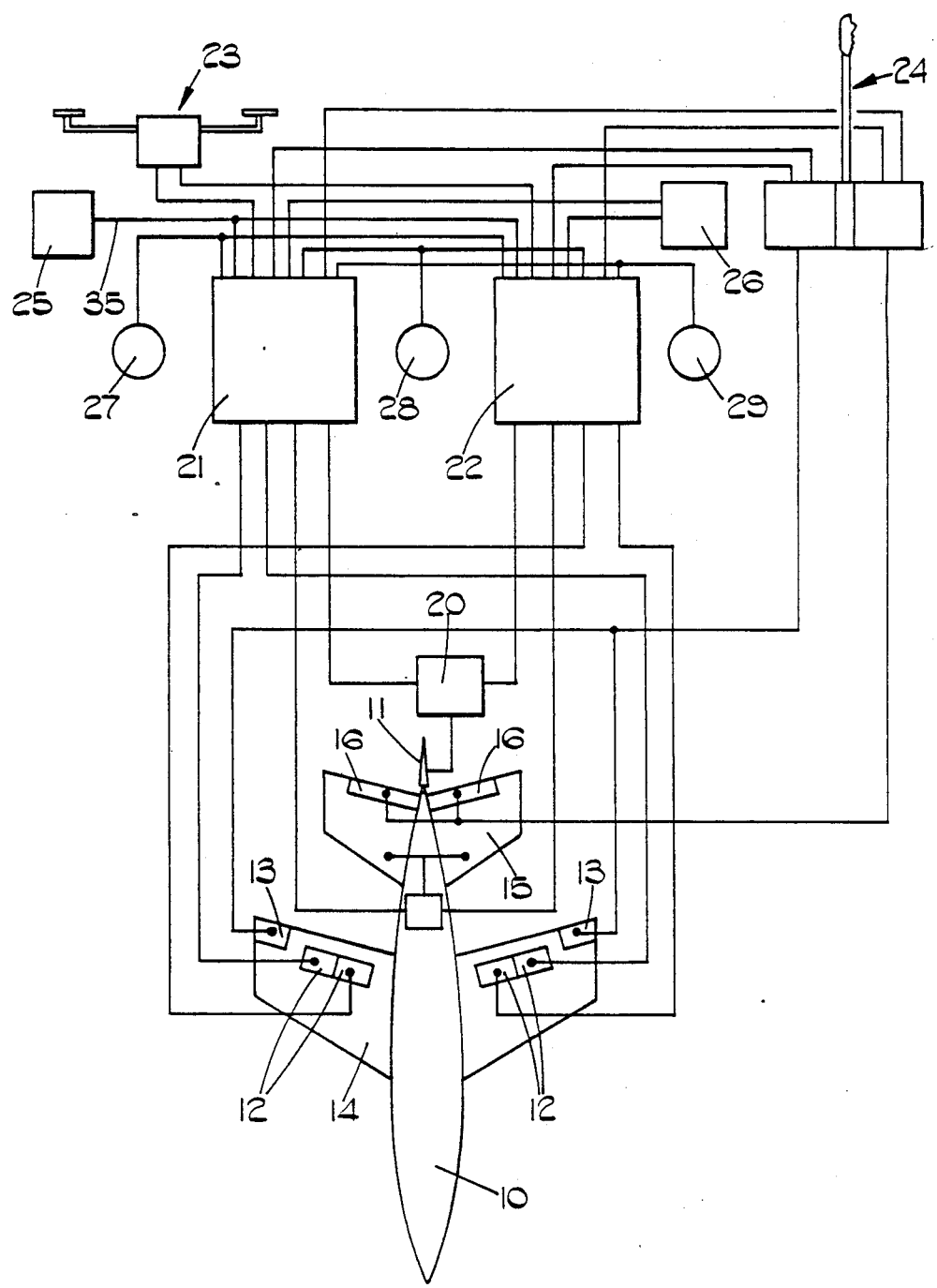

United States Patent [19]

Glaze et al.

[11] Patent Number: 4,671,166
[45] Date of Patent: Jun. 9, 1987

[54] ELECTRO-HYDRAULIC ACTUATOR SYSTEMS

[75] Inventors: Stanley G. Glaze, Kingswinford; Robert G. Burrage, Solihull, both of England

[73] Assignee: Lucas Industries public limited company, England

[21] Appl. No.: 783,965

[22] Filed: Oct. 4, 1985

[30] Foreign Application Priority Data

Oct. 19, 1984 [GB] United Kingdom ............... 8426486

[51] Int. Cl.⁴ .............................................. F15B 13/16
[52] U.S. Cl. ......................................... 91/361; 91/521; 244/233
[58] Field of Search ................. 91/362, 527, 459, 532, 91/521, 523; 244/223

[56] References Cited

U.S. PATENT DOCUMENTS

| | | | |
|---|---|---|---|
| 2,769,603 | 11/1956 | McDonnell | 244/179 |
| 3,128,968 | 4/1964 | Kaufman et al. | 91/361 |
| 3,422,327 | 1/1969 | McBrayer et al. | 318/18 |
| 3,543,641 | 12/1970 | Deplante | 91/361 |
| 4,294,162 | 10/1981 | Fowler et al. | 91/361 |
| 4,370,706 | 1/1983 | Doniger et al. | 364/184 |
| 4,437,385 | 3/1984 | Kramer et al. | 91/361 |

FOREIGN PATENT DOCUMENTS

| | | | |
|---|---|---|---|
| 48512 | 12/1985 | European Pat. Off. | 91/361 |
| 2082799 | 3/1982 | United Kingdom | 91/361 |
| 2119966 | 11/1983 | United Kingdom | |

*Primary Examiner*—James C. Yeung
*Attorney, Agent, or Firm*—Leydig, Voit & Mayer

[57] ABSTRACT

An electrohydraulic actuator system has a first pair of actuators and a control circuit and a control valve for each actuator. The control circuits generate actuator position error signals and are also responsive to divergence of the operating position of the respective valves from a mean valve operating position thereby tending to maintain the valve operating positions, and hence the forces on the actuators, identical. The magnitudes of the position error signals are limited to limit overdrive of the valves in the event of minor malfunctions thereof and to permit a malfunction indication to be provided. The system also includes a further pair of actuators having an associated control circuit which is responsive to a selected differential position of the further actuators, for causing one of these actuators to be driven away from a limiting position of the other actuator until the required position differential is obtained.

11 Claims, 11 Drawing Figures

ELECTRO-HYDRAULIC ACTUATOR SYSTEMS

This invention relates to hydraulic actuator systems in which fluid pressures for positioning an actuator are controlled by an electro-hydraulic valve whose flow control element is operated by electrical input signals which are dependent on selected and sensed positions of the actuator.

It is known to provide such a system having duplicated hydraulic actuators which are coupled for movement in unison and which provide an output force which is the sum of the forces from the separate actuators. It is a disadvantage of such an arrangement that minor differences in the electrical input signals to the duplicated electro-hydraulic control valves, or tolerances in the valves themselves, may result in differences between the hydraulic pressures applied to the respective actuators, so that the actuators will then, to some extent at least, oppose one another.

It is an object of one aspect of the invention to overcome the above difficulty without resorting to highly critical tolerances in either the mechanical or electrical components.

Since each of the aforesaid electrical input signals depends on a difference between a selected and a sensed position of an actuator, and corresponds to a position of the electro-hydraulic valve control element required to effect actuator movement to its selected position, a deficiency or minor malfunction in the valve may result in its control element failing to move immediately to the selected position. In such a case the electrical input signal will be maintained, overdriving the control element to cause the selected actuator position to be reached. It is a disadvantage of known systems that such overdrive is likely to mask malfunction of the valve and in addition to drive the valve control element substantially past its selected position, giving rise to additional malfunctions in the system. It is an object of a further aspect of the invention to provide an actuator system in which the foregoing problem is overcome.

It is also known to provide an actuating system in which each of two hydraulic actuators are independently operable but may be required either to move in unison to identical positions or to move independently to operating positions which differ by a selected amount. It is an object of a third aspect of the invention to provide an actuator system which meets the foregoing requirements, so that differential positioning of the actuators is achievable even if they have previously been moved to identical positions which are at or near either of their limits of travel.

According to one aspect of the invention an electro-hydraulic actuator system comprises first and second substantially identical hydraulic actuators connected for force-summing movement in unison, first and second substantially identical electro-hydraulic valves having flow control elements for regulating supply of fluid pressure to said first and second actuators respectively, first and second control circuits responsive to desired and actual positions of said actuators for generating first and second control signals for positioning the control elements of said first and second valves respectively, said control system also including means for generating a third signal corresponding to a difference between a mean value of the sensed positions of said flow control elements and the sensed position of the flow control element in said first valve, and means for generating a fourth signal corresponding to a difference between said mean value and a sensed position of the flow control element in said second valve, said control circuits including means for modifying said first and second control signals in accordance with said third and fourth signals respectively, whereby said flow control elements are positioned identically and supply identical fluid pressures to said actuators.

According to a further aspect of the invention an electro-hydraulic actuator system comprises a hydraulic actuator, a circuit for generating an error signal which is dependent on a difference between desired and sensed positions of said actuator, an electro-hydraulic valve having a flow control element responsive to an electrical input signal for regulating a supply of pressurised fluid to said actuator, and means for deriving said input signal from said error signal, said system also including means responsive to said error signal and to a signal dependent on the sensed position of said valve control element, for limiting the magnitude of a change in said input signal in response to a difference between said error and sensed valve position signals.

A preferred embodiment of said further aspect of the invention includes means responsive to said error signal for generating a signal corresponding to a calculated position of said valve control element, and a circuit responsive to a difference between the calculated and sensed positions of the valve control element for generating an indicating signal if this difference exceeds a predetermined amount for more than a predetermined time.

According to a third aspect of the invention an electro-hydraulic actuator system comprises two hydraulic actuators, two electro-hydraulic valves for controlling supply of fluid pressure to respective ones of said actuators, means for generating a first signal indicative of a required amount of differential movement between the actuators, means responsive to said first signal for generating second and third signals of opposite sense and equal magnitude, and means for decreasing said second and third signals by values corresponding to the amounts by which said third and second signals respectively exceed predetermined levels, respective ones of said valves being responsive to said second and said third signals, whereby a level of said first signal which would require one of said actuators to move by a selected amount in one direction beyond a limiting position results in movement of the other actuator by the same amount in the opposite direction away from that position.

In a preferred embodiment of said third aspect of the invention there is provided means for generating a fourth signal indicative of an amount by which said actuators are required to be moved in unison, and means for adding said fourth signal to said second and third signals.

Figure 2:
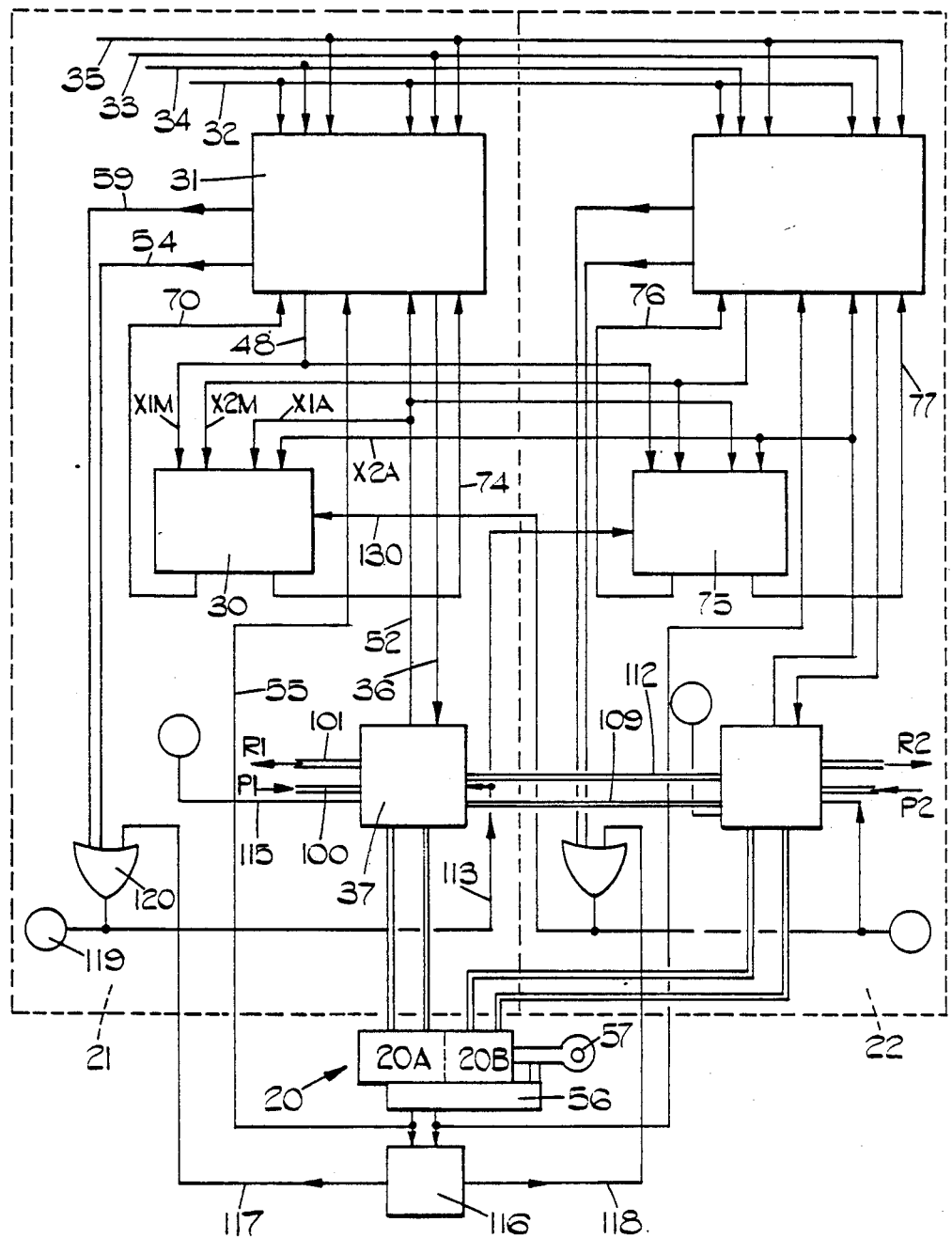
Figure 3:
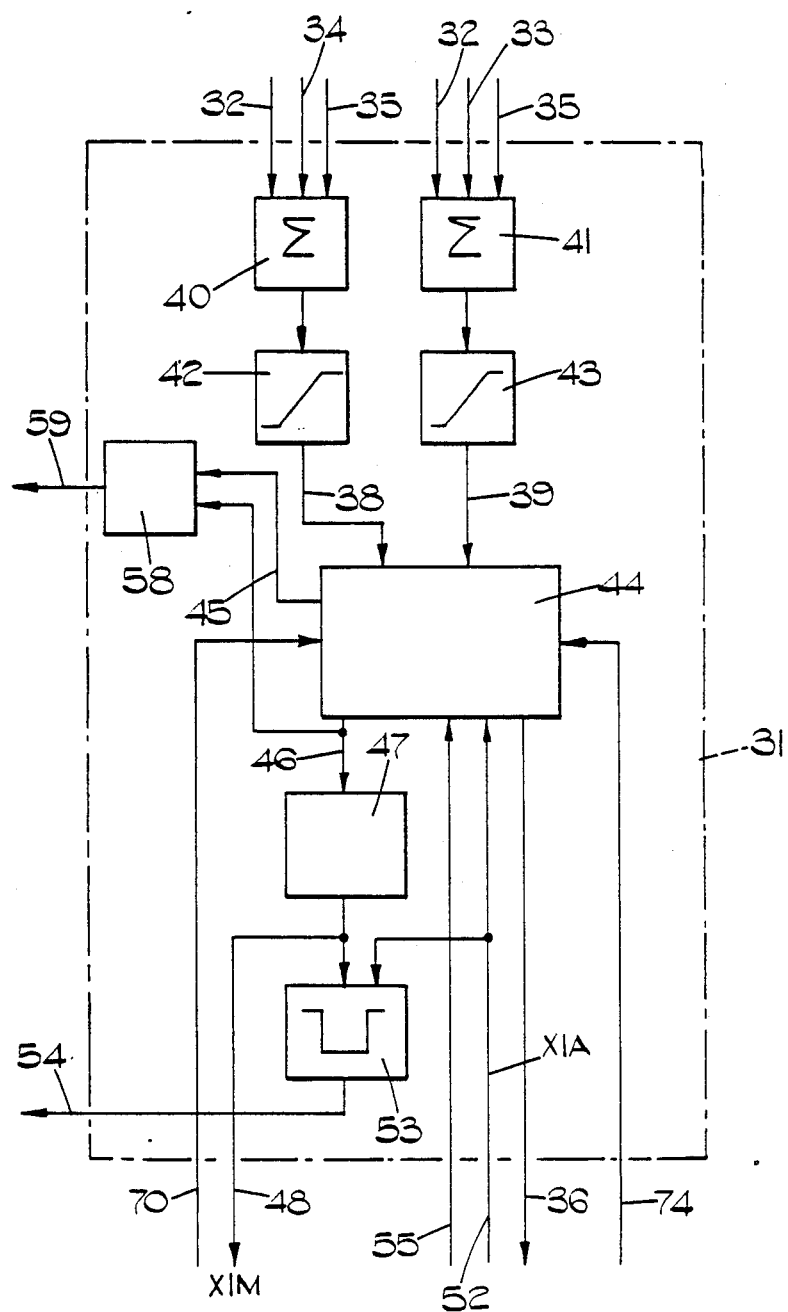
Figure 4:
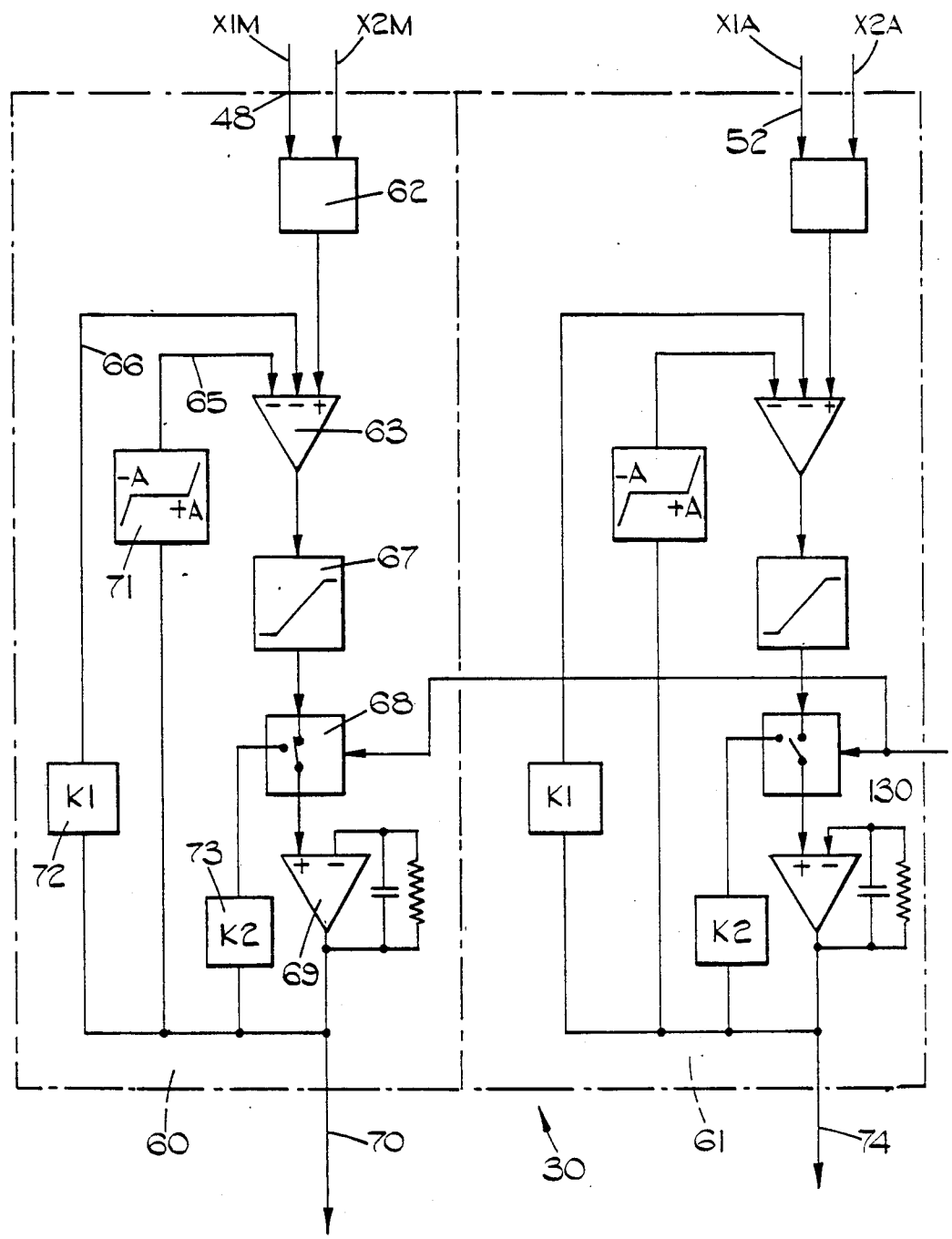
Figure 5:
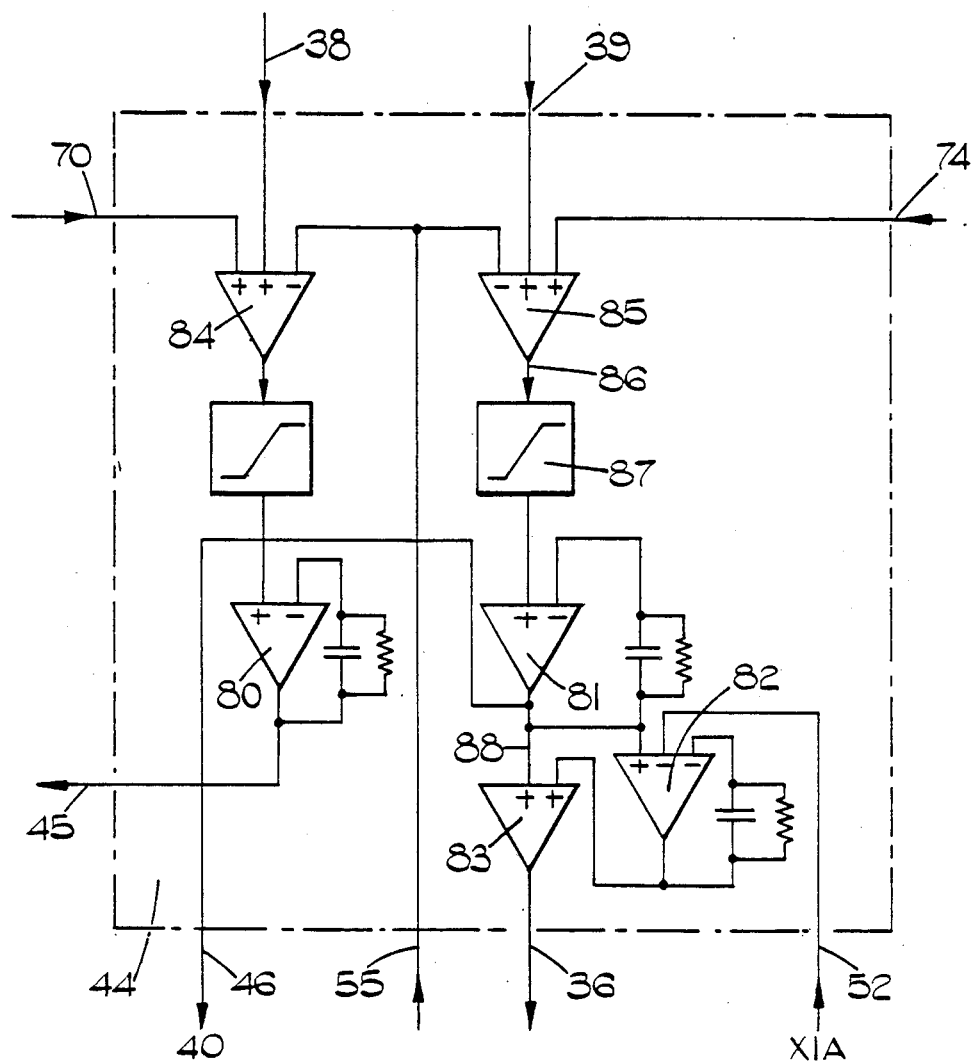
Figure 6:
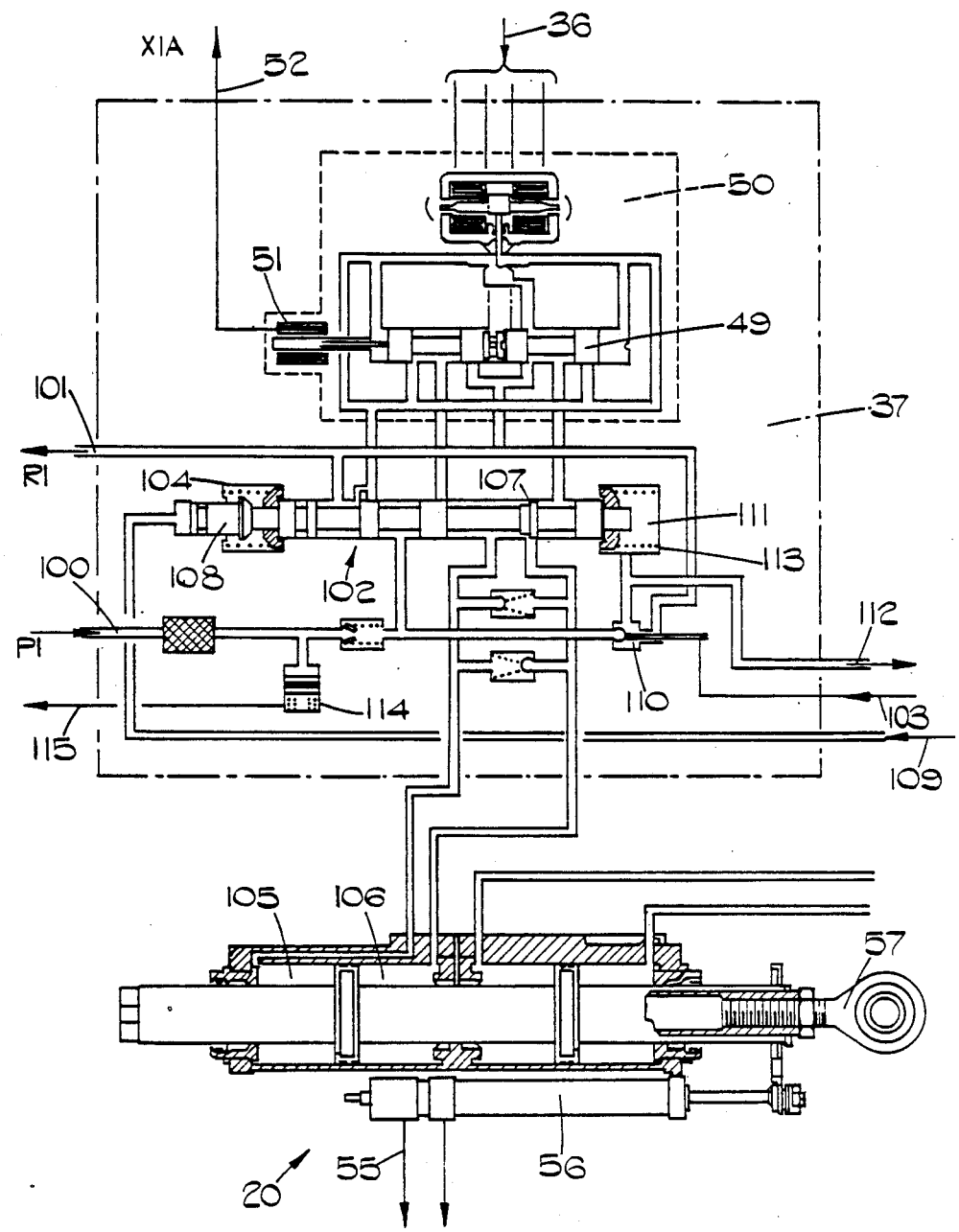
Figure 7:
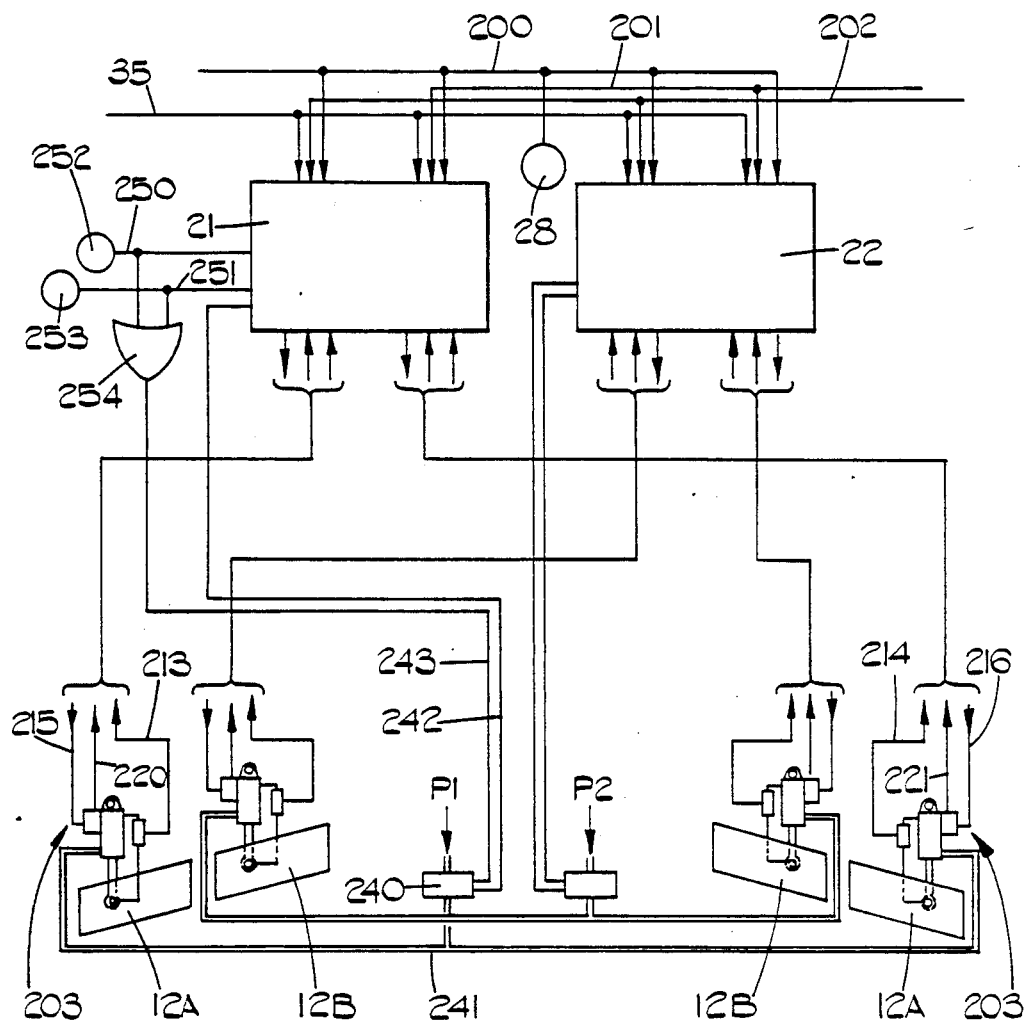
Figure 8:
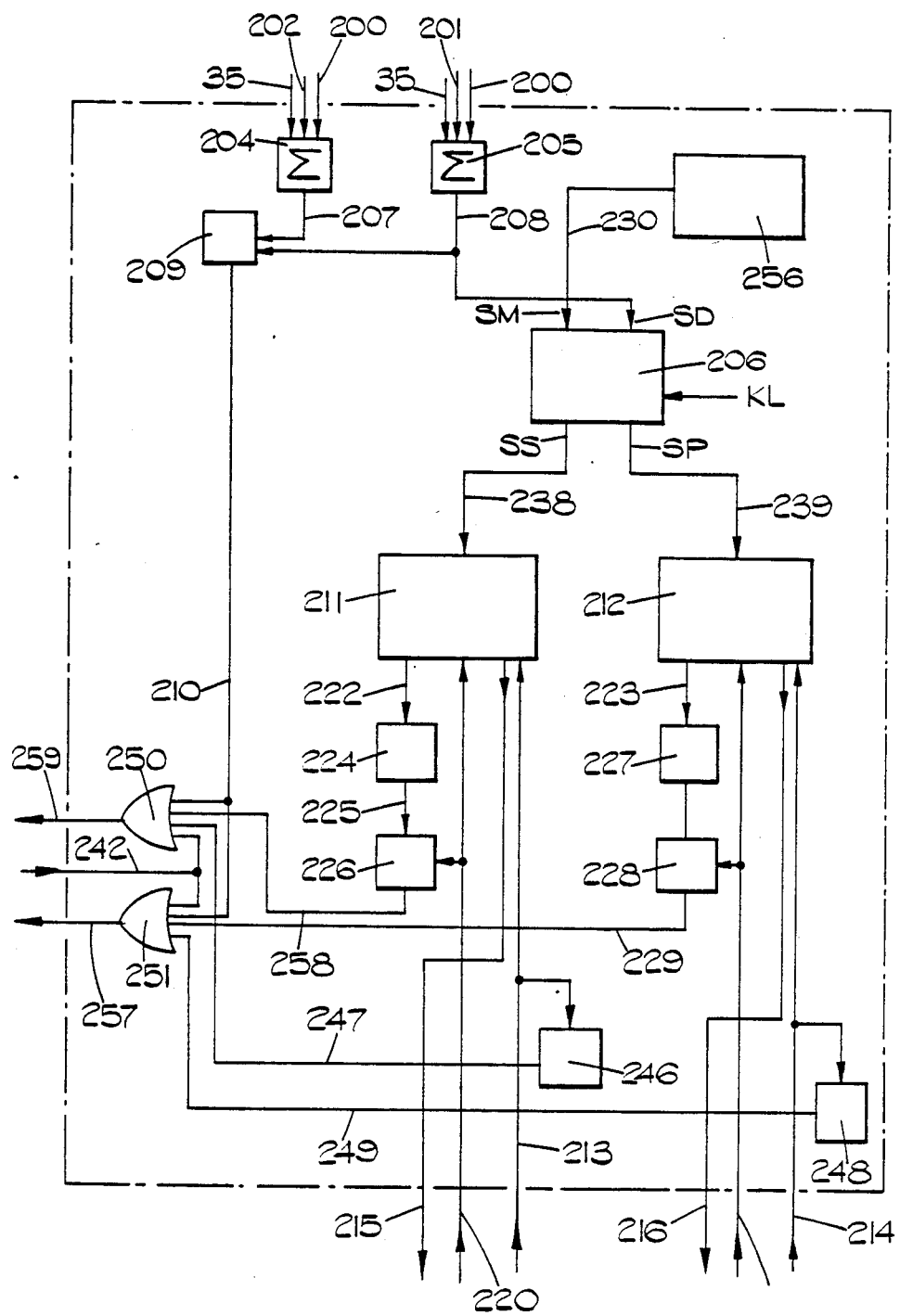
Figure 9:
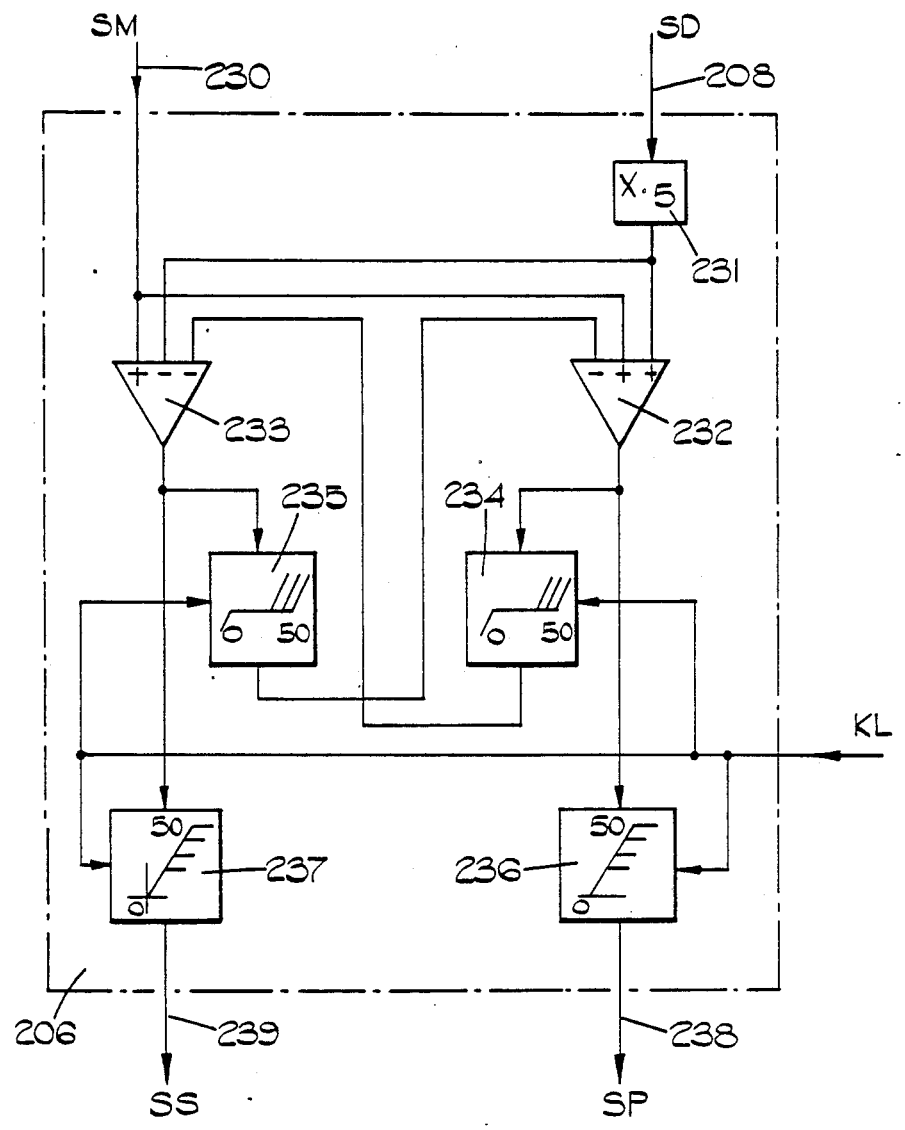
Figure 10:
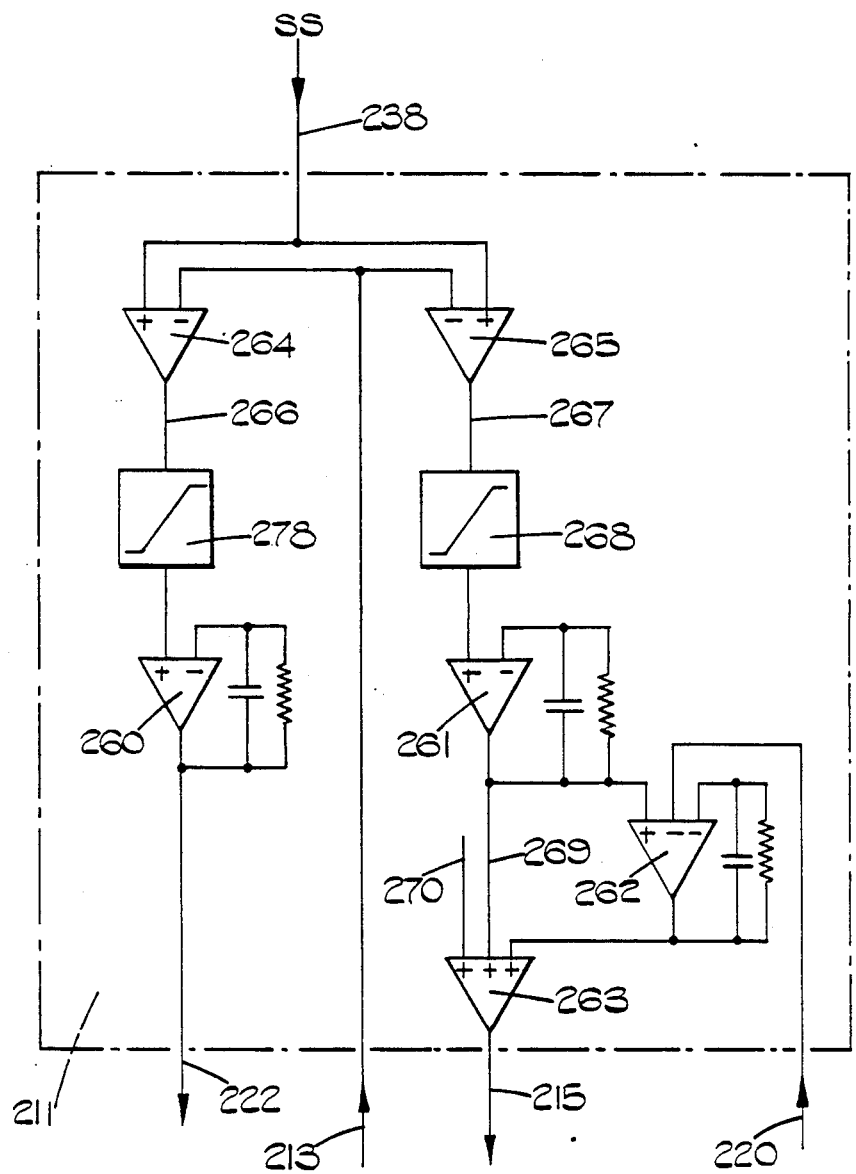
Figure 11:
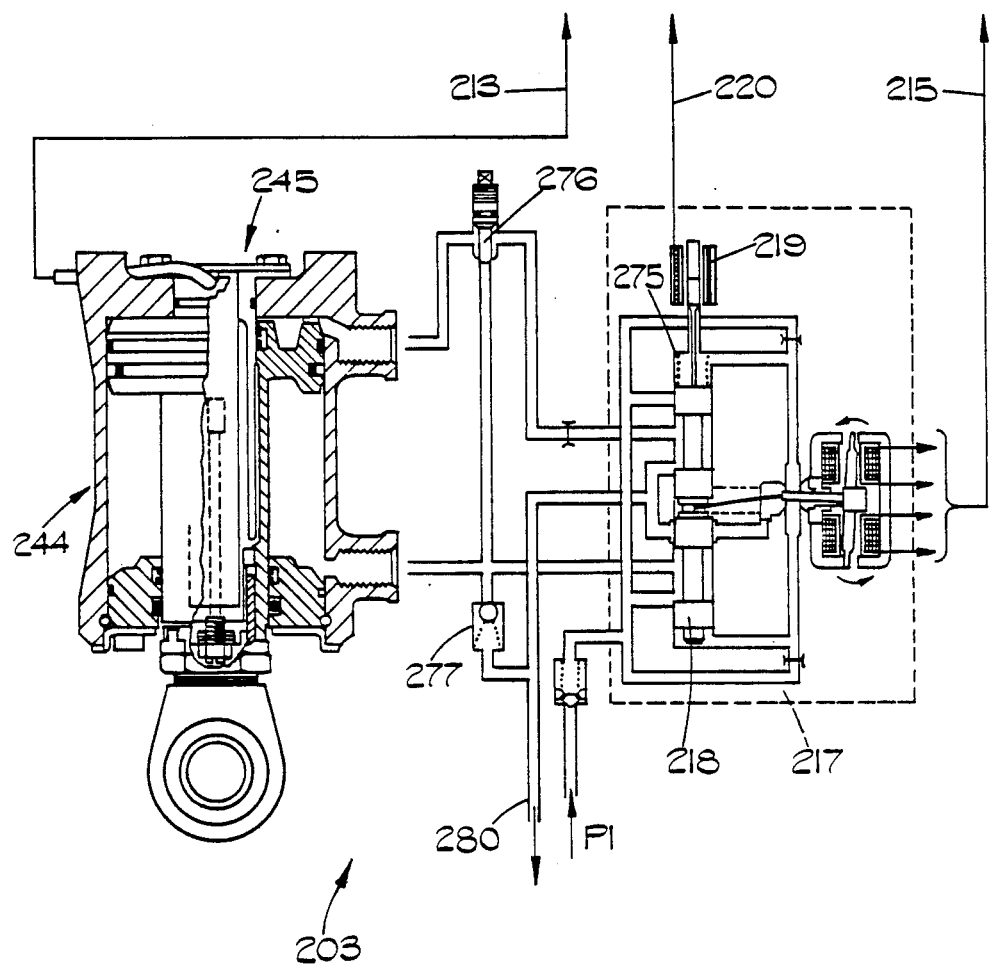

An embodiment of the invention will now be described by way of example only and with reference to the accompanying drawings, in which:

FIG. 1 is a diagram of a plurality of electrohydraulic actuating systems as applied to the control surfaces of an aircraft, FIG. 2 is a more detailed diagram of one of the actuator systems of FIG. 1, FIG. 3 is a block diagram of an electrical control circuit forming part of the system of FIG. 2, FIG. 4 is a block diagram of a circuit forming part of the system of FIG. 2, FIG. 5 is a diagram of part of the circuit of FIG. 3, FIG. 6 shows an electro-hydraulic device and a hydraulic actuator forming part of the system of FIG. 2, FIG. 7 is a diagram of another of the actuator systems of FIG. 1, FIG. 8 is a block diagram of a control circuit forming part of the system of FIG. 7, FIGS. 9 and 10 are diagrams of parts of the circuit of FIG. 8, and FIG. 11 shows an electro-hydraulic device and hydraulic actuator forming part of the system of FIG. 7.

As shown in FIG. 1, an aircraft 10 has a plurality of control surfaces including a rudder 11, four spoilers 12 and two ailerons 13 on a main plane 14, a tail plane 15 and two elevators 16 on the tail plane 15. Pitch of the aircraft is controlled by the tail plane 15 and elevators 16, roll by the spoilers 12 and ailerons 13 and yaw by the rudder 11. The rudder 11 is operated by a tandem hydraulic actuator 20 which is responsive to hydraulic pressures from each of two identical control arrangements 21, 22. Each of the control arrangements 21, 22 is responsive to electrical input signals from pilot's control pedals 23, from a control column 24, from a trim signal generator 25, from a pivot pressure sensor 26 and from rate gyros 27, 28, 29 for yaw, roll and pitch respectively.

Each of the four spoilers 12 is operated by a separate hydraulic actuator, the outboard spoilers 12 being under control of the arrangement 21, and the inboard spoilers being under control of the arrangement 22. The tail plane 15 is acted upon by two separate hydraulic actuator halves 20A, 20B (FIG. 6) which are under control of respective ones of the arrangements 21, 22, the outputs of these actuator halves being mechanically summed by a common shaft. The ailerons 13 and elevator 16 are separately controlled by the control column 24.

FIGS. 2 to 6 show in more detail a part of the system of FIG. 1, as it relates to control of the rudder 11. The arrangements 21, 22 are, as shown in FIG. 2, generally similar. Only the arrangement 21 will therefore be described in detail. The arrangement 21 includes a control and monitoring circuit 31 which is responsive to signals on line 32 from the yaw rate gyro 27, on line 33 from a first transducer operated by the pedals 23, on a line 34 from a second, monitor transducer operated by the pedals 23 and on a line 35 from the trim signal generator 25. The signals on lines 33, 34 are nominally identical and are used as will be explained hereinafter, to provide monitoring of the input signals to the arrangements 21, 22. The circuit 31 provides an electrical operating signal on a plurality of lines 36 to an electro-hydraulic valve arrangement 37 which, together with the actuator 20 is shown in more detail in FIG. 6. A hydraulic supply pressure P1 is applied to the valve arrangement 37 which regulates the hydraulic pressure applied to one half 20A of the tandem actuator 20.

As shown in FIG. 3, the control and monitoring circuit 31 includes a first summing device 40 responsive to signals on the lines 32, 34, 35 from the gyro 27, pedal monitor transducer and the trim signal generator 25 respectively. A further summing device 41 is responsive to signals on the lines 32, 33, 35. Output signals from the devices 40, 41 are thus respectively dependent on the signals from the monitor and active transducers of the pedals 23, and are applied to respective limiting circuits 42, 43. The signals from the limiting circuits 42, 43 are supplied on respective lines 38, 39, to a trimming circuit 44, shown in more detail in FIG. 5. The trimming circuit 44 is responsive to the signal on line 39 to provide operating signals on the lines 36 to the valve arrangement 37, and on a line 46 to a circuit 47 which provides an output signal X1M on a line 48, this signal X1M being an analog model of the position of a control element 49 (FIG. 6) of an electrohydraulic servo valve in the valve arrangement 37. The circuit 44 is also responsive to the signal on line 38 to provide a signal on a line 45. The signals on lines 46 and 45 are applied as inputs to a comparator circuit 58 which provides a signal on a line 59 is there is an unacceptable discrepancy between these input signals for more than a predetermined time. A sensed positon X1A of the position of the element 49 is obtained from a suitable transducer 51 and supplied on a line 52 to the control and monitoring circuit 31. The signals X1A on line 52 and X1M on line 48 are also supplied to a comparator circuit 53 which provides an output signal on a line 54 if the difference between signals X1A and X1M exceeds ±3% of the signal X1M for more than a predetermined time. The trimming circuit 44 is also responsive to a positon feedback signal on a line 55 from a displacement transducer 56 (FIG. 6), this signal being responsive to the position of the output element 57 of the actuator 20 and hence to the position of the rudder 11.

The equalising circuit 30 is shown in more detail in FIG. 4 and is responsive to the aforementioned signals X1M in line 48 and X1A on line 52. The equalising circuit 30 is also responsive to signals X2M and X2A from the control arrangement 22 (FIG. 2) and respectively corresponding to the model and sensed positions of an element of the electro-hydraulic servo valve in the arrangement 22.

The equalising circuit 30 comprises two identical circuit arrangements 60, 61, only one of which will be described in detail. The arrangement 60 includes a circuit 62, to which the two model signals X1M and X2M are applied. The circuit 62 provides an output signal which corresponds to $[(X1M+X2M)/2]-X1M$, that is the amount by which X1M differs from the mean of X1M and X2M. This output signal is supplied to the non-inverting input of a difference amplifier 63. Feedback signals are applied on lines 65, 66 to the inverting inputs of the amplifier 63. The output signal from amplifier 63 is supplied through a rate limiting circuit 67 and through a change-over switch device 68 to an integrating amplifier 69 which provies a trimming output signal on a line 70, this trimming signal also corresponding to the value $[(X1M+X2M)/2]-X1M$. The feedback signal on line 65 is provided only when the output of the amplifier 69 exceeds the values +A or −A, as determined by a limiting circuit 71. A signal on line 65 causes the input to the rate limiting circuit 67 to be removed, and thereby limits the signal on line 70 to a range corresponding to +A and −A. The feedback signal on line 66 is derived from the signal on line 70 through a delay circuit 72 having a time constant K1, the arrangement being such that a step change in the output signal from the circuit 62 results in a slower change in the signal on line 70. In the event of malfunction of the servo valve in the arrangement 22, a circuit corresponding to the circuit 53 provides, in a manner to be described, a signal on the line 130. This signal on line 130 results, in a manner to be described, in operation of the change-over switch device 68 to isolate the amplifier 69 from the signals X1M, X2M and to connect the amplifier 69 to a delay circuit 73 having a time constant K2 of approximately 20 seconds. The circuit 73 provides a delayed negative feedback signal from the trimming signal on line 70. Thus, operation of the change-over switch 68 in response to a malfunction signal causes the signal on line 70 initially to be maintained at the level at which the malfunction occurred and then slowly to reduce to zero as the negative feedback signal is applied by the circuit 73. The signal on line 70 is applied to the trimming circuit 44 (FIG. 5) which forms part of the control and monitoring circuit 31.

The function of the trimming circuit is, as will be described, to reduce differences between the signals to the electro-hydraulic valves in the respective arrangements 21, 22, in normal operating conditions. Delay of the signal on line 70 allows the switching device 68 to be operated in the event of a malfunction in the arrangement 22 before signals from the circuit 44 attempt to cause the valve arrangement 37 to match the corresponding valve in the arrangement 22. The circuit arrangement 61 is, as described above, identical with the arrangement 60, and is responsive to the sensed position signal X1A of the control element 49 (FIG. 6) and the position X2A of the control element in the corresponding electro-hydraulic servo valve in the control arrangement 22 (FIG. 2). The circuit arrangement 61 provides a trimming signal on a line 74 to the trimming circuit 44 (FIG. 5).

As shown in FIG. 5, the trimming circuit 44 includes integrating amplifiers 80, 81, 82, a power amplifier 83 and difference amplifiers 84, 85. The input signals on lines 38, 39 from the limiting circuit 42, 43 (FIG. 3) are applied to non-inverting inputs of the respective amplifiers 84, 85. The position feedback signal on line 55 from the transducer 56 (FIG. 6) is applied to inverting inputs of the amplifiers 84, 85. The signal on line 70 from the equalising circuit 30 (FIG. 4) is applied to a further non-inverting input of the amplifier 84, and the signal on line 74 from the equalising circuit 30 is applied to a non-inverting input of the amplifier 85. A signal on a line 86 from the amplifier 85 thus corresponds to a difference between desired and sensed positions of the rudder actuator 20, modified in accordance with a difference between the operating position X1A of the electrohydraulic valve 50 and the mean of that position and the position X2A of the corresponding valve in the control arrangement 22 (FIG. 2). The signal on line 86 from amplifier 85 is applied by way of a limiting circuit 87 to the amplifier 81, the circuit 87 effectively limiting the rate of response of the amplifier 81. The signal on line 52 from the transducer 51 (FIG. 6) is applied to an inverting input of the amplifier 82 and the output signal on a line 88 from amplifier 81 is applied to non-inverting inputs of amplifiers 82, 83. The output signal from amplifier 82 is applied to a further non-inverting input of the power amplifier 83.

The output signal on line 88 is limited by the amplifier 81 so as to correspond to an output current of 10 mA from the power amplifier 83. The output signal from amplifier 82 is limited to correspond to an output current of 1.8 mA from the power amplifier 83. The power amplifier 83 provides the operating signal on line 36 to servo valve 50 (FIG. 6). The signal on line 36 is a demand signal for an operating position of the electrohydraulic valve 50 and is limited by the amplifier 82 to a maximum of 118% of the position demanded by the signal on line 88. Thus even if a large discrepancy arises between the demanded operating position and the sensed position indicated by the feedback signal X1A on line 52, as a result of some deficiency in the valve 50, an overdrive signal applied in an attempt to correct the discrepancy will be limited to the 18% value from the amplifier 82. This has the effect that severe deficiencies in the valve 50 will be detected by the comparator 53 (FIG. 3) instead of being masked by a high overdrive signal. Additionally the valve 50 is less likely to be urged substantially past its selected position, and thereby give rise to additional and more severe failures.

The output signal on line 46 from the amplifier 81 is responsive to a difference between desired and sensed positions of the actuator 20, as modified by the signal on line 74, and is applied to the analog model circuit 47 and the comparator circuit 58 (FIG. 3) as previously described.

The effect of the signal on line 74 from the circuit 30 is that the operating signals on line 36 to the servo valve 50 (FIG. 6) and on line 46 to the model circuit 47 are increased or decreased so as to render the operating position of the control element 49 in that valve equivalent to the operating position of the corresponding control element in the control arrangement 22. The operating pressures to the two halves of the tandem actuator 20 are thus maintained equal in normal operation of the system. The signal on line 46 to the analog model circuit 47 is similarly responsive to the trimming signal on line 74 from the circuit 30, so that the calculated values X1M and X2M are maintained substantially equal to each other and to the signals X1A and X2A. In normal operating conditions, therefore, correction of the operating signal on line 36 to bring the servo valve 50 in to an operating condition corresponding to that of the servo valve in the arrangement 22 is matched by a corresponding correction to the model circuit 47, whereby the comparator 53 provides no output indication on line 54.

The equalising circuit 75 (FIG. 2) in the control arrangement 22 is similarly responsive to the values X1M, X2M, X1A and X2A and provides signals on line 76, 77, these signals respectively corresponding to $[(X1M+X2M)/2]-X2M$ and $[X1A+X2A)/2]-X2A$. The servo valves in both arrangements 21 and 22 are thus urged to a mean position. The model circuits in both arrangements are also controlled to supply corresponding output signals.

As shown in FIG. 6, the electro-hydraulic valve arrangement 37 includes the servo valve 50 and is connected to a first supply pressure P1 by a line 100 and with a first return pressure R1 by a line 101. Pressures P1 and R1 communicate with the servo valve 50 through a combined shut-off and by-pass spool control element 102. The element 102 is urged by springs 103, 104 to a position (shown) in which the servo valve 50 is isolated from the lines 100, 101 and in which there is a by-pass connection between two chambers 105, 106 of the actuator half 20A. In this position a land 107 in the element 102 provides a flow restriction between chambers 105, 106. The element 102 can be urged rightwardly to its normal operating position by a plunger 108 which is responsive to a pressure in a line 109 from the corresponding valve arrangement in the control arrangement 22. The arrangement is such that pressure is present in the line 109 in the absence of a malfunction in the arrangement 22. In normal operation a solenoid valve 110 is urged by the pressure P1 to a position in which this pressure is admitted to a chamber 111, the greater area of the spool element 102 adjacent the chamber 111 causing the element 102 to be moved leftward against the force exerted by the plunger 108. In this condition of the solenoid valve 110 the pressure P1 is also applied through a line 112 to the corresponding shut-off and by-pass valve in the arrangement 22, the pressure in line 112 being applied to a plunger corresponding to the plunger 108. The pressure in line 109 is derived from a solenoid valve, corresponding to the valve 110, in the arrangement 22.

In the event of a malfunction in the arrangement 21 a signal is applied on a line 113 to urge the solenoid valve 110 to the position shown, connecting the chamber 111 and the line 112 to the return pressure R1, whereupon the spool of the element 102 moves rightward to the position shown, shutting off pressures P1 and R1 from the servo valve 50. The reduced pressure in line 112 ensures that the corresponding shut-off and by-pass valve in the arrangement 22 remains in its leftward, operating condition in the absence of a malfunction in the arrangement 22. If both of the arrangements 21, 22 should malfunction, both of the shut-off and by-pass valves will operate, and the two chambers of the respective halves of the actuator 20 will be interconnected through the flow restriction provided by the land 107 and by the corresponding land in the arrangement 22. The actuator 20 may then be moved by aerodynamic forces on the rudder 11 to a position of no-load. A pressure switch 114 provides an indicating signal on a line 115 when the pressure P1 is at its normal operating level.

The transducer 56 comprises two differential transformers which supply position feedback signals to the arrangements 21, 22 respectively. The sum of the output voltages of the secondary windings of a differential transformer will, in correct operation, be substantially constant. These secondary winding voltages are summed, for the separate transformers, in a monitoring circuit 116. In the event that the sum of the voltages from the secondary windings departs by more than a predetermined amount from the aforesaid constant value, a signal is provided on a line 117 or 118, dependent on which of the transformers has malfunctioned.

As shown in FIG. 2, the arrangements 21, 22 are responsive to separate input hydraulic pressures P1 and P2, and to separate return pressures R1 and R2. As indicated in that figure, moreover, the following signals are applied to an OR gate 120, whose output provides the signal on line 113 to operate the solenoid valve 110 (FIG. 6):

(i) a signal on line 59 from the comparator circuit 58 (FIG. 3) indicating an unacceptable discrepancy between the signals on lines 45 and 46;

(ii) a signal on the line 54 from the comparator circuit 53 indicating an unacceptable discrepancy between the signals on lines 52 and 48 from the servo valve transducer 51 and the modelling circuit 47 respectively;

(iii) a signal on line 117 from the monitoring circuit 116 indicating that the differential transformer which provides the signal on line 55 has malfunctioned.

Any of these signals will result in a signal on line 113 which renders the arrangement 21 inoperative, energises an indicating device 119, and operates a change-over switch in the equalising circuit 75, corresponding to the switch 68 in the equalising circuit 30 (FIG. 4).

Any corresponding malfunction in the arrangement 22 will render that arrangement inoperative and provide a signal on the line 130 (FIGS. 2 and 4) to operate the change-over switch in the equalising circuit 30.

FIGS. 7 to 11 relate to an actuator system for the spoilers 12 (FIG. 1). The outboard spoilers 12A are controlled by the arrangement 21 and the inboard spoilers 12B are under control of the arrangement 22. For the purpose of control of the spoilers 12 the control arrangements 21, 22 are responsive to signals on a line 200 from the roll rate gyro 28, on a line 201 from a transducer operated by the control column 24, on a line 202 from a monitor transducer operated by the control column 24, and on the line 35 from the trim signal generator 25 (FIG. 1).

The spoilers 12 are movable by hydraulic actuator arrangements 203, one of which is shown in more detail in FIG. 11. The actuator arrangements 203 for the outboard spoilers 12A are connected to the hydraulic pressure supply P1 and the actuator for the inboard spoilers 12B are connected to the hydraulic pressure supply P2.

The portion of the control arrangement 21 which is concerned with the spoilers 12 will now be described in more detail, the corresponding portion of the control arrangement 22 being identical.

As shown in FIG. 8, the arrangement 21 includes a summing device 204 responsive to signals on the lines 35, 202 and 200 from the trim signal generator 25, the control column monitor transducer and the roll rate gyro 28 respectively. A further summing device 205 is responsive to signals on the line 35 and 200 and also to the signal on line 201 from the control column transducer. Output signals from the summing devices 204, 205 are thus respectively responsive to signals from the monitor and active transducers of the control column 24 and are applied through respective lines 207, 208 to a comparator circuit 209 which provides an output signal on a line 210 if the signals on lines 207, 208 differ by more than a predetermined amount. The signals on line 208 are also applied to control signal modifying circuit 206 which is shown in more detail in FIG. 9.

The signals SD on line 208 correspond to differential roll commands for the outboard spoilers. The modifying circuit 206 is also responsive to signals SM on a line 230 from a selector switch device 256. The signals SM on line 230 provide commands for deploying the spoilers symmetrically, either as air brakes or for reducing lift when landing. Since the spoilers also control roll of the aircraft it is necessary that the spoilers shall always be capable of differential movement to their required relative positions even though they may be at, or near, their limiting positions as air brakes. The modifying circuit 206 ensures that the foregoing differential movement can always be obtained.

As shown in FIG. 9 the circuit 206 comprises a x 0.5 dividing circuit 231, two differential amplifiers 232, 233, two feedback limit circuits 234, 235 and two output limiting circuits 236, 237. The signal SD on line 208 is halved in magnitude by the dividing circuit 231 and applied to a non-inverting input of amplifier 232 and to an inverting input of amplifier 233. The signal SM on line 230 is applied to non-inverting inputs of both amplifiers 232, 233. The output signals from the amplifiers 232, 233 have magnitudes and senses which correspond to the required angular movement of the port and starboard spoilers respectively. The magnitudes of the control signals SP and SS to the port and starboard spoilers respectively are limited by the respective circuits 236, 237 to values which correspond to deployment of up to 50° on each side. The limits imposed by the circuits 236, 237 are dependent on a signal KL which corresponds to the magnitude of a dynamic air pressure acting on the spoilers, this air pressure being derived from the pitot sensor 26 (FIG. 1).

The feedback limiting circuits 234, 235 are also responsive to the signal KL and provide output signals only when their input signals reach levels determined by the value of KL, the maximum values of the output signals from the circuits 234, 235 also corresponding to 50° deployment of the spoilers. The output signals from the circuits 234, 235 are applied to inverting inputs of the respective amplifiers 233, 232.

In use, therefore, half the differential position signal SD is supplied to a spoiler on each side, to urge these spoilers to move equally in opposite directions to their required relative positions. If, for example both spoiler control signals SS, SP are already at their maximum values in response to the signal SM, then a differential signal SD which requires SP to be greater than SS will be passed by circuit 234 to augment the SD/2 signal applied to the amplifier 233. The required angular difference between the spoilers will thereby be achieved.

The signals SS, SP to the starboard and port spoilers, are applied on respective lines 238, 239 to respective amplifying circuits 211, 212, one of which is shown in more detail in FIG. 10. As shown in FIG. 8 the circuits 211, 212 are responsive to position feedback signals on respective lines 213, 214 from actuator arrangements 203 (FIG. 11) of the respective outboard spoilers 12A. The circuits 211, 212 provide, on lines 215, 216, control signals to electro-hydraulic servo valves (one of which is indicated at 217 in FIG. 11) which form part of the respective actuator arrangements 203. The position of a spool control element 218 in the servo valve 217 is detected by a suitable transducer 219 and supplied as a feedback signal on a line 220 to the circuit 211. A corresponding feedback signal is supplied on a line 221 to the circuit 212. The circuits 211, 212 also provide, on respective lines 222, 223, signals which correspond to the control signals on lines 215, 216. The signal on line 222 is applied to a circuit 224 which provides an output signal on a line 225, this signal being an analog model of the position of the control element 218 (FIG. 11) in the actuator arrangement 203 which is responsive to the signal on line 215. The signals on lines 220 and 225 are applied to a comparator circuit 226 which provides a signal on a line 258 when a difference between its two input signals exceeds a predetermined amount.

The signal on line 223 from circuit 212 is applied to an analog model circuit 227 identical with the circuit 224, and a comparator circuit 228 is responsive to the signal on line 221 and to the signal from the circuit 227 to provide a signal on a line 229 when a difference between these two last signals exceeds a predetermined amount.

As shown in FIG. 7 the hydraulic supply pressure P1 is applied to the actuator arrangements 203 through a device 240 and a supply conduit 241. The device 240 includes a switch which operates to provide a signal on a line 242 in the event that the pressure P1 falls below a predetermined level. The device 240 also includes an electromagnetic shut-off valve which is responsive to a signal on a line 243 to connect the conduit 241 to a low pressure.

As shown in FIG. 11 a double-acting hydraulic piston and cylinder unit 244 is responsive to pressure signals from the servo valve 217. Located within the piston of the unit 244 is a position transducer in the form of a differential transformer, indicated at 245, which provides the position feedback signals on lines 213. The output voltages of the secondary windings of the transformer 245 are summed in a circuit 246 (FIG. 8). in the event that this voltage sum departs by more than a predetermined amount from an expected constant value, a signal is provided on a line 247. A circuit 248 is responsive to the position feedback signals on lines 214 to provide a signal on a line 249 if the sum of the secondary winding voltages from the corresponding transformer departs from an expected constant value.

The signals on lines 210, 258, 242 and 247 are applied to an OR gate 250 which provides a signal on a line 259 in the presence of a signal at any of its inputs. The signals on lines 210, 229, 242 and 249 are applied to an OR gate 251, which provides a signal on line 257. The signals on lines 259, 257 are supplied to respective indicating devices 252, 253 and to a further OR gate 254, which provides the signal on line 243.

As shown in FIG. 10 the circuit 211 includes integrating amplifiers 260, 261, 262, a power amplifier 263, and difference amplifiers 264, 265. The input signal SS on line 239 is applied to non-inverting inputs of the amplifiers 264, 265, and the position feedback signal on line 213 from the transducer 245 (FIG. 11) is applied to inverting inputs of these amplifiers. Signals on lines 266, 267 from the respective amplifiers 264, 265 thus correspond to a difference between desired and sensed positions of the starboard spoiler. The signal on line 267 is applied to the amplifier 261 through a limiting circuit 268 which limits the rate of response of the amplifier 261. The signal on line 220 from the transducer 245 (FIG. 11) is applied to an inverting input of the amplifier 262, and the output signal on line 269 from the amplifier 261 is applied to non-inverting inputs of the amplifiers 262, 263. The output signal from the amplifier 262 is applied to a further non-inverting input of the amplifier 263.

The output signal on line 269 is limited by the amplifier 261 to correspond to an output current of 10 mA from the power amplifier 263. The output signal from the amplifier 262 is limited so as to correspond to an output current of 1.8 mA from the power amplifier 263. A biasing signal corresponding to an output current of 3.0 mA from the power amplifier 263 is applied on a line 270 to a non-inverting input of the amplifier 263. The current range of the operating signal on line 215 to the servo valve 217 is thus from 14.8 mA in one direction to 8.8mA in the opposite direction.

Each of the electro-hydraulic servo valves in the respective actuator arrangements 203 is supplied with a biasing electrical signal which is independent of the control arrangements 21, 22 and which is equal to 30% of the rated input current and is such as to urge the control element 218 (FIG. 11) to the position shown in that figure, in which position the piston and cylinder unit 244 is urged to retract the associated spoiler. A bias applied to line 270 (FIG. 10) is equal and opposite to the aforesaid electrical bias, whereby in normal operation and in the absence of an input signal on line 208 the control element 218 adopts a central position. In the event that the supply pressure P1 falls below a predetermined value, a spring 275 (FIG. 11) acts on the control element 218 to urge it to the position shown, whereby any residual hydraulic pressure urges the unit 244 to retract the associated spoiler. Additionally, aerodynamic forces on the spoiler will urge the unit in the same direction, hydraulic fluid displaced by this movement passing through an adjustable flow restriction 276 and a non-return valve 277 to a low pressure return line 280.

Referring back to FIG. 10, the signal on line 266 from the amplifier 264 is applied to the amplifier 260 through a rate-limiting circuit 278 identical with the circuit 268. The output signal form the amplifier 260 is supplied on the line 222 to the analog model circuit 224 (FIG. 8) previously referred to.

The inboard spoilers 12B are operated by systems which are identical with those described above for the outboard spoilers 12A, and which also form part of the control arrangement 22 (FIG. 7).

In a modified form of the actuating system of FIGS. 7 to 11, there are provided two identical modifying circuits 206 (FIGS. 8 and 9). In this case each of the modifying circuits 206 is responsive to the signals SM and SD on respective lines 230, 208 and provides nominally identical signals SS and nominally identical signals SP. The amplifiers 264, 265 in the circuit 211 (FIGS. 8 and 10) are responsive to respective ones of the signals SS, and the corresponding amplifiers in the circuit 212 are responsive to respective ones of the signals SP.

The circuits 211, 212 are identical with each other and with the circuits 44 (FIGS. 3 and 5) in the actuating system for the rudder 11. In this modified form, therefore, the comparator circuit 209 (FIG. 8) is not provided, but two such comparator circuits, for monitoring the signals SS and SP respectively, are provided, and correspond to the comparator circuit 58 in the rudder actuating system.

We claim:

1. An electro-hydraulic actuator system comprising first and second substantially identical hydraulic actuators connected for force-summing movement in unison, first and second substantially identical electro-hydraulic valves having flow control elements for regulating supply of fluid pressure to said first and second actuators, respectively, first and second control circuits responsive to selected and sensed positions of said actuators for generating first and second control signals for positioning the control elements of said first and second valves, respectively, means for generating a third control signal corresponding to a difference between a mean value of the sensed positions of said flow control elements and a sensed position of the flow control elements in said first valve, and means for generating a fourth control signal corresponding to a difference between said mean value and a sensed position of the flow control element in said second valve, said control circuits including means for modifying said first and second control signals in accordance with said third and fourth control signals, respectively, whereby said flow control elements are positioned identically to supply identical fluid pressures to said actuators.

2. A system as claimed in claim 1 further including first and second model signal generating circuits responsive to said first and second control signals, respectively, for generating signals corresponding to selected positions of the flow control elements of said first and second electro-hydraulic valves, respectively, and means for generating first and second indicating signals when a difference between sensed and selected values of the positions of said flow control elements exceeds a predetermined amount.

3. A system as claimed in claim 1 in which each of said means for generating said third and fourth control signals includes means for limiting the rate of change of said third and fourth signals, respectively.

4. A system as claimed in claim 2 in which each of said means for generating said third and fourth control signals includes means respectively responsive to said first and second indicating signals for causing said third and fourth control signals to fall to zero after predetermined intervals.

5. A system as claimed in claim 4 further including means for limiting the magnitudes of said third and fourth controls signals.

6. A system as claimed in claim 1 further including means for generating both a controlling value and a monitor value of said selected actuator positions, means responsive to said monitor value and to a second position of said actuator for generating a monitor signal, and means for generating a third indicating signal when said monitor signal differs from at least one of said first and second control signals by more than a predetermined amount.

7. An electro-hydraulic actuator system comprising a hydraulic actuator, a circuit for generating an error signal dependent on a difference between selected and sensed positions of said actuator, an electro-hydraulic valve having a flow control element responsive to an electrical input signal for regulating a supply of pressurised fluid to said actuator, and means for deriving said input signal from said error signal, said system also including means responsive to said error signal and to a sensing signal dependent on the sensed position of said flow control element for limiting the magnitude of a change in said input signal in response to a difference between said error signal and said sensing signal.

8. A system as claimed in claim 7 further including means for generating a signal corresponding to a selected position of said valve control element, and a circuit responsive to a difference between the selected and sensed positions of the flow control element for generating an indicating signal when said difference exceeds a predetermined amount for more than a predetermined time.

9. A system as claimed in claim 7 in which said means for limiting the magnitude of a change in said input signal comprises means for generating a control signal whose magnitude is a fixed fraction of the magnitude of said error signal, said means for deriving said input signal being responsive to the sum of said error and control signals.

10. An electro-hydraulic actuator system comprising two hydraulic actuators, two electro-hydraulic valves for controlling supply of fluid pressure to respective ones of said actuators, means for generating a first signal indicative of a required amount of differential movement between the actuators, means responsive to said first signal for generating second and third signals of opposite sign and equal magnitude, and means for decreasing said second and third signals by values corresponding to the amounts by which said third and second signals respectively exceed predetermined levels, respective ones of said valves being responsive to said second and said third signals, whereby a level of said first signal required from one of said actuators to move by a selected amount in one direction beyond a limiting position results in movement of the other actuator by the same amount in the opposite direction away from that position.

11. A system as claimed in claim 10 further including means for generating a fourth signal indicative of an amount by which said actuators are required to be moved in unison, and means for adding said fourth signal to said second and third signals.

* * * * *